(12) United States Patent
Ma et al.

(10) Patent No.: US 11,700,589 B2
(45) Date of Patent: Jul. 11, 2023

(54) SYNCHRONIZATION SIGNAL BLOCK TRANSMISSIONS IN NON-TERRESTRIAL NETWORKS

(71) Applicant: QUALCOMM Incorporated, San Diego, CA (US)

(72) Inventors: Liangping Ma, San Diego, CA (US); Xiao Feng Wang, San Diego, CA (US); Ayan Sengupta, San Diego, CA (US); Alberto Rico Alvarino, San Diego, CA (US); Bharat Shrestha, San Diego, CA (US); Jun Ma, San Diego, CA (US); Peter Gaal, San Diego, CA (US); Umesh Phuyal, San Diego, CA (US); Dan Zhang, San Diego, CA (US); Qiang Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 17/320,897

(22) Filed: May 14, 2021

(65) Prior Publication Data
US 2021/0385773 A1    Dec. 9, 2021

Related U.S. Application Data

(60) Provisional application No. 63/035,580, filed on Jun. 5, 2020.

(51) Int. Cl.
*H04W 56/00* (2009.01)
*H04B 7/185* (2006.01)

(52) U.S. Cl.
CPC ........ *H04W 56/0015* (2013.01); *H04B 7/185* (2013.01)

(58) Field of Classification Search
CPC .. H04B 7/185; H04B 7/1851; H04W 56/0015
(Continued)

(56) References Cited

U.S. PATENT DOCUMENTS 11,317,394 B2 *   4/2022   Liu ................... H04W 56/0015
2018/0337755 A1 * 11/2018   John Wilson ......... H04L 5/0048
(Continued)

OTHER PUBLICATIONS

Ericsson: "On Sync and PBCH-SIB Reading in NTN", 3GPP Draft, 3GPP TSG-RAN WG1 Meeting #95, Tdoc R1-1813372 on Sync and PBCH-SIB Reading in NTN, 3rd Generation Partnership Project (3GPP), Mobile Competence Centre, 650, Route Des Lucioles, F-06921 Sophia-Antipolls Cedex, France, vol. RAN WG1, No. Spokane, USA, Nov. 12, 2018-Nov. 16, 2018 Nov. 3, 2018 (Nov. 3, 2018), XP051479687, pp. 1-4.

(Continued)

*Primary Examiner* — Robert J Lopata
(74) *Attorney, Agent, or Firm* — Patterson & Sheridan, LLP

(57) ABSTRACT

Certain aspects of the present disclosure provide techniques for synchronization signal block (SSB) transmission in different frequency intervals. A method that may be performed by a user equipment (UE) includes receiving a first SSB from an entity in a non-terrestrial network (NTN) at a first time and frequency location. The method generally includes determining one or more time and frequency locations of one or more other SSBs from the entity in the NTN based on the first time and frequency location. The method generally includes monitoring for the one or more other SSBs at the determined one or more time and frequency locations.

28 Claims, 14 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2019/0028315 A1 | 1/2019 | Park | |
| 2020/0153500 A1 | 5/2020 | Kim et al. | |
| 2020/0162182 A1* | 5/2020 | Zhang | H04J 11/0073 |
| 2020/0314892 A1* | 10/2020 | Wang | H04W 74/0833 |
| 2021/0119697 A1* | 4/2021 | Wang | H04B 7/18543 |
| 2021/0194571 A1* | 6/2021 | Ma | H04B 7/2125 |
| 2022/0150849 A1* | 5/2022 | Zhao | H04L 27/2626 |
| 2022/0272643 A1* | 8/2022 | Harada | H04W 56/00 |
| 2022/0272664 A1* | 8/2022 | Takeda | H04W 72/005 |

OTHER PUBLICATIONS

Intel Corporation: "On Measurement Gap for NR" 3GPP Draft, 3GPP TSG-RAN WG4 Meeting #84, R4-1707418 on Measurement Gap for NR, 3rd Generation Partnership Project (3GPP), Mobile Competence Centre, 650, Route Des Lucioles, F-06921 Sophia-Antipolis Cedex, France, vol. RAN WG4, No. Berlin, Germany, Aug. 21, 2017-Aug. 25, 2017 Aug. 20, 2017 (Aug. 20, 2017), XP051320645, pp. 1-6, Retrieved from the Internet: URL:http://www.3gpp.org/ftp/Meetings_3GPP_SYNC/RAN4/Docs/ [retrieved on Aug. 20, 2017] Section 3 p. 4, Figure 1, p. 5, Figure 1.
International Search Report and Written Opinion—PCT/US2021/032644—ISA/EPO—dated Sep. 27, 2021.

\* cited by examiner

SYNCHRONIZATION SIGNAL BLOCK TRANSMISSIONS IN NON-TERRESTRIAL NETWORKS

CROSS-REFERENCE TO RELATED APPLICATION(S)

This application claims benefit of and priority to U.S. Provisional Application No. 63/035,580, filed Jun. 5, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for synchronization signal block (SSB) transmissions. Aspects related to SSB transmission in different frequency intervals in non-terrestrial networks (NTNs).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved synchronization signal block (SSB) transmissions in non-terrestrial networks (NTNs).

Certain aspects of the subject matter described in this disclosure can be implemented in a method for wireless communication by a user equipment (UE). The method generally includes receiving a first SSB from an entity in a NTN at a first time and frequency location. The method generally includes determining one or more time and frequency locations of one or more other SSBs from the entity in the NTN based on the first time and frequency location. The method generally includes monitoring for the one or more other SSBs at the determined one or more time and frequency locations.

Certain aspects of the subject matter described in this disclosure can be implemented in a method for wireless communication by an entity in a NTN. The method generally includes sending a first SSB at a first time and frequency location. The method generally includes determining one or more time and frequency locations of one or more other SSBs based on the first time and frequency location. The method generally includes sending the one or more other SSBs at the determined one or more time and frequency locations.

Certain aspects of the subject matter described in this disclosure can be implemented in an apparatus for wireless communication. The apparatus generally includes at least one processor and a memory coupled to the at least one processor. The memory generally includes code executable by the at least one processor to cause the apparatus to receive a first SSB from an entity in an NTN at a first time and frequency location. The memory generally includes code executable by the at least one processor to cause the apparatus to determine one or more time and frequency locations of one or more other SSBs from the entity in the NTN based on the first time and frequency location. The memory generally includes code executable by the at least one processor to cause the apparatus to monitor for the one or more other SSBs at the determined one or more time and frequency locations.

Certain aspects of the subject matter described in this disclosure can be implemented in an apparatus for wireless communication. The memory generally includes code executable by the at least one processor to cause the apparatus to send a first SSB at a first time and frequency location. The memory generally includes code executable by the at least one processor to cause the apparatus to determine one or more time and frequency locations of one or more other SSBs based on the first time and frequency location. The memory generally includes code executable by the at least one processor to cause the apparatus to send the one or more other SSBs at the determined one or more time and frequency.

Certain aspects of the subject matter described in this disclosure can be implemented in an apparatus for wireless communication. The apparatus generally includes means for receiving a first SSB from an entity in an NTN at a first time and frequency location. The apparatus generally includes means for determining one or more time and frequency locations of one or more other SSBs from the entity in the NTN based on the first time and frequency location. The apparatus generally includes means for monitoring for the one or more other SSBs at the determined one or more time and frequency locations.

Certain aspects of the subject matter described in this disclosure can be implemented in an apparatus for wireless communication. The apparatus generally includes means for sending a first SSB at a first time and frequency location. The apparatus generally includes means for determining one or more time and frequency locations of one or more other SSBs based on the first time and frequency location. The apparatus generally includes means for sending the one or more other SSBs at the determined one or more time and frequency locations.

Certain aspects of the subject matter described in this disclosure can be implemented in a computer readable medium storing computer executable code thereon for wireless communication. The computer readable medium generally includes code for receiving a first SSB from an entity in an NTN at a first time and frequency location. The computer readable medium generally includes code for determining one or more time and frequency locations of one or more other SSBs from the entity in the NTN based on the first time and frequency location. The computer readable medium generally includes code for monitoring for the one or more other SSBs at the determined one or more time and frequency locations.

Certain aspects of the subject matter described in this disclosure can be implemented in a computer readable medium storing computer executable code thereon for wireless communication. The computer readable medium generally includes code for sending a first SSB at a first time and frequency location. The computer readable medium generally includes code for determining one or more time and frequency locations of one or more other SSBs based on the first time and frequency location. The computer readable medium generally includes code for sending the one or more other SSBs at the determined one or more time and frequency locations.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
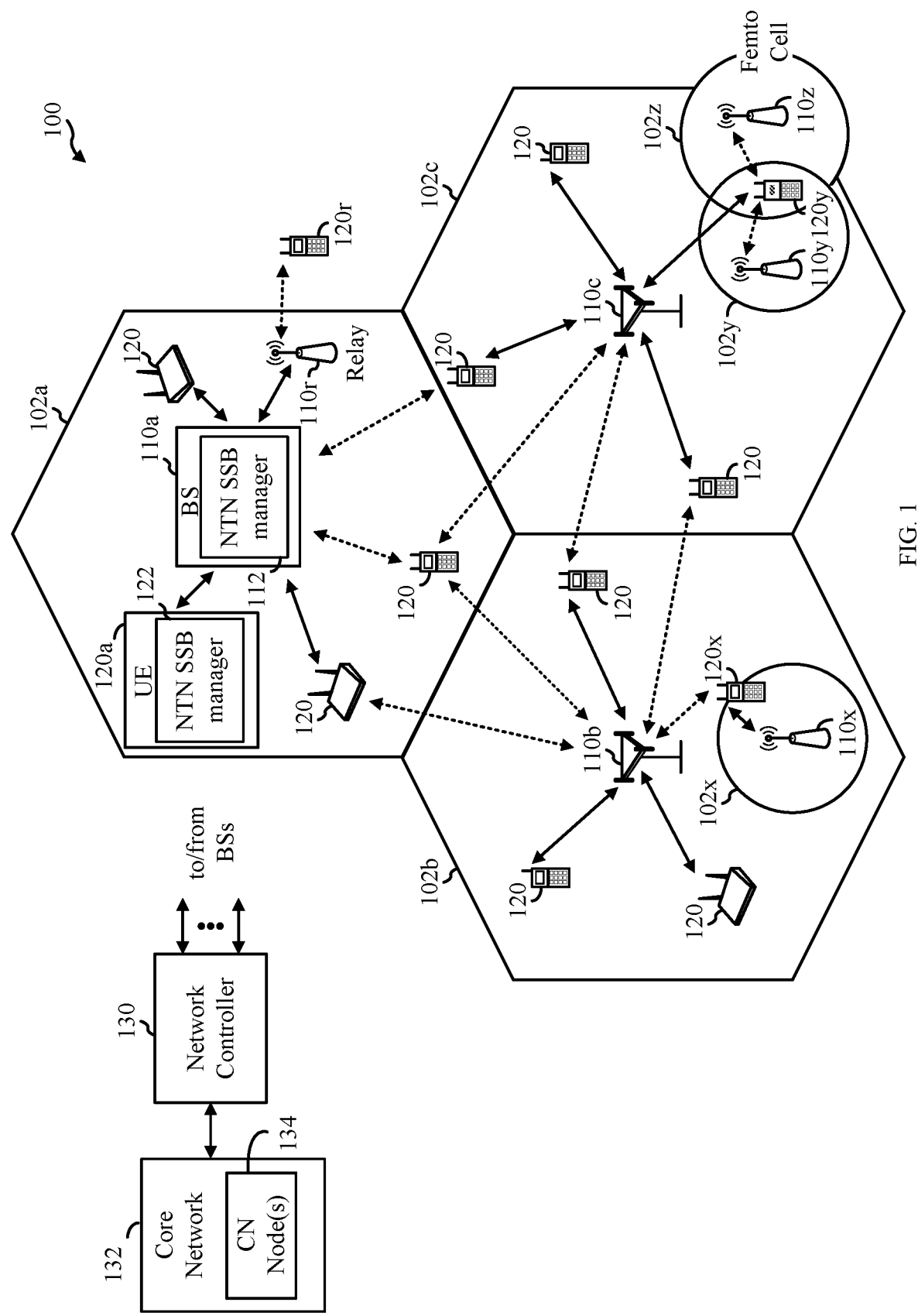
FIG. 1 is a block diagram conceptually illustrating an example wireless communication network, in accordance with certain aspects of the present disclosure.

Aspects of the present disclosure provide apparatus, methods, processing systems, and computer readable mediums for synchronization signal block (SSB) transmission, including SSB transmission in different frequency intervals in non-terrestrial networks (NTNs).

In certain networks, such as new radio networks (e.g., 5G NR), SSBs for the same cell are transmitted on the same frequency interval.

NTNs may involve high altitude platform devices (e.g., low earth orbit (LEO) satellites) to solve coverage problems and difficult use-cases that terrestrial networks alone cannot address. In an NTN, a satellite may use multiple antennas to form multiple narrow beams and the beams may operate on different frequency intervals to mitigate interference among the beams. Thus, to comply with NR, when the beams are configured as a same cell, the beams are switched frequently from the frequency interval associated with the beam to the frequency interval used for SSB transmission. On the other hand, when the beams are configured as different cells, handovers may be used to switch the beams.

Aspects of the present disclosure provide techniques for SSB transmission in an NTN. In some aspects, the SSB transmissions follow a time and frequency pattern. The user equipment (UE) may be aware of the pattern and, therefore, may be able to determine the locations of the SSB transmissions after detecting a first SSB. Aspects provide for a time gap between SSB transmissions for the UE to switch beams. Aspects provide for assigning beams to SSBs, such that the number of time gaps can be minimized. Aspects provide for the raster(s) used by the UE to search for the SSBs.

The following description provides examples of SSB transmissions in different frequency intervals in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave (mmW), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or UE 120a-y (each also individually referred to herein as UE 120 or collectively as UEs 120) in the wireless communication network 100 via one or more interfaces.

According to certain aspects, UEs 120 may be configured for SSBs monitoring in different frequency intervals in NTN. As shown in FIG. 1, the BS 110a may include a NTN SSB manager 112. The NTN SSB manager 112 may configure the UE 120a for monitoring SSBs, in accordance with aspects of the present disclosure. As shown in FIG. 1, the UE 120a includes a NTN SSB manager 122. The NTN SSB manager 122 may be configured to receive a first SSB from an entity in a NTN at a first time and frequency location; determine one or more time and frequency locations of one or more other SSBs from the entity in the NTN based on the first time and frequency location; and monitor for the one or more other SSBs at the determined one or more time and frequency locations, in accordance with aspects of the present disclosure.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
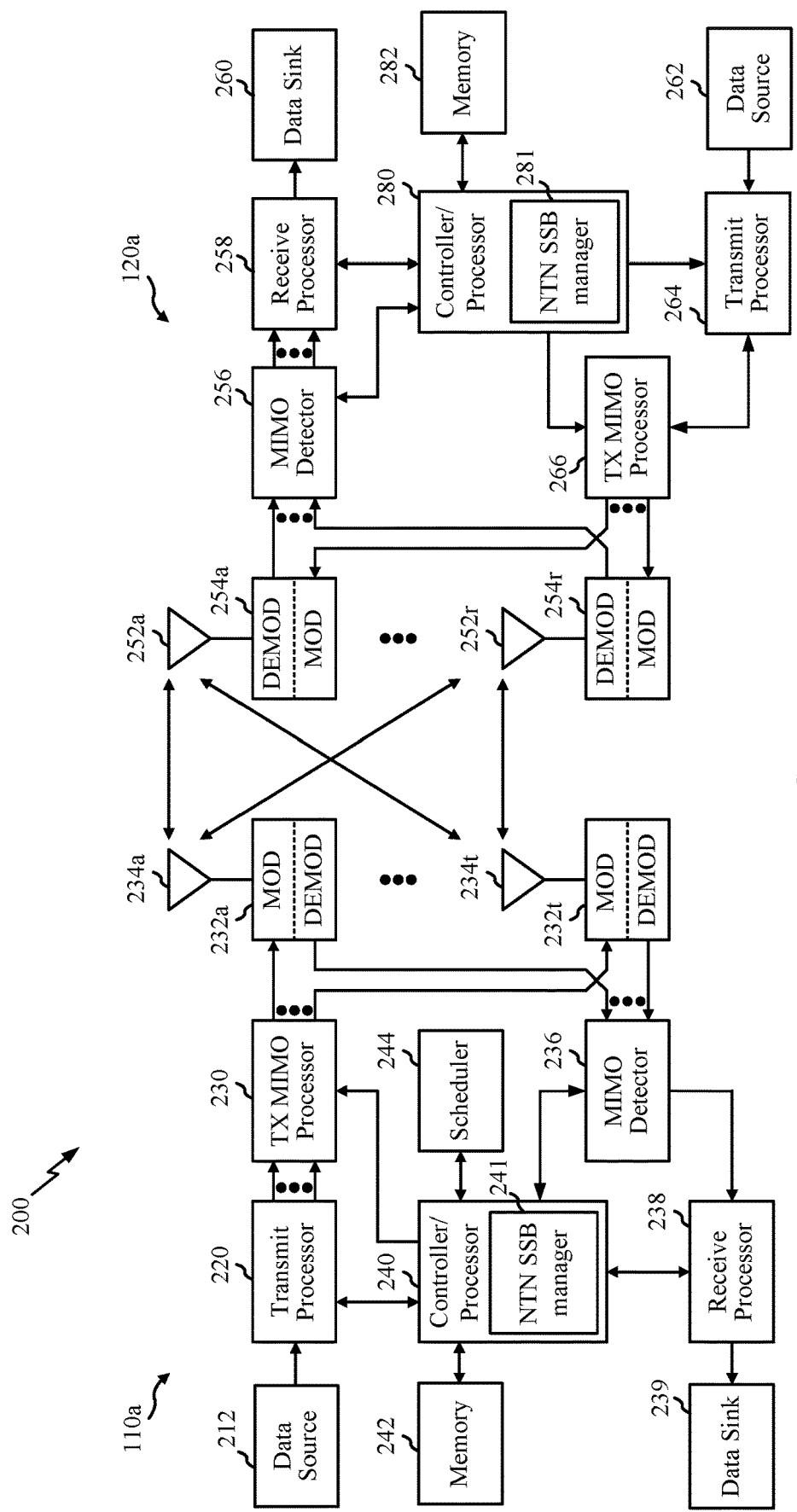
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has an NTN SSB manager 241 that may be configure the UE 120a for monitoring SSBs, according to aspects described herein. As shown in FIG. 2, the controller/processor 280 of the UE 120a has an NTN SSB manager 281 that may be configured for receive a first SSB from an entity in a NTN at a first time and frequency location; determine one or more time and frequency locations of one or more other SSBs from the entity in the NTN based on the first time and frequency location; and monitor for the one or more other SSBs at the determined one or more time and frequency locations, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
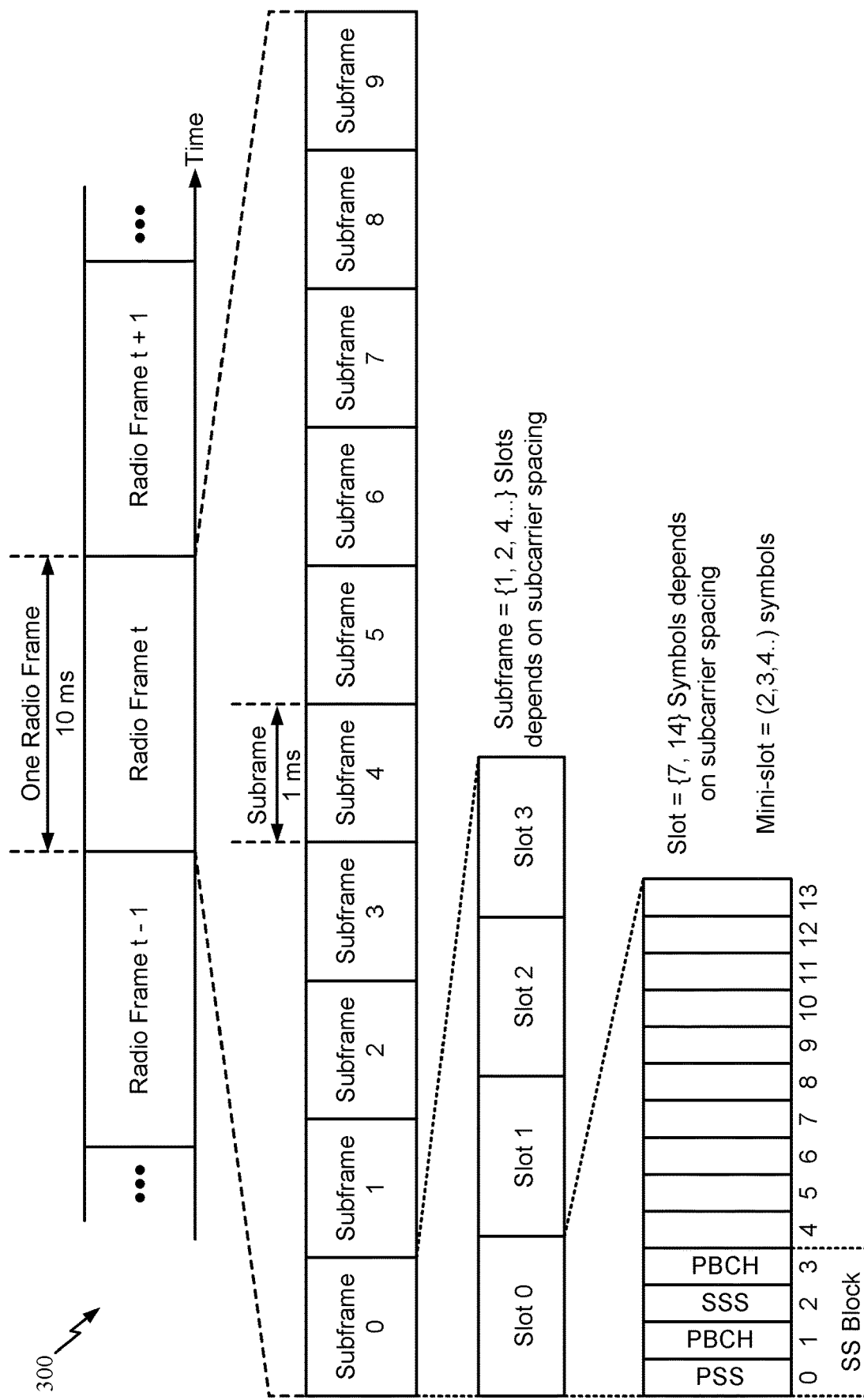
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB may be transmitted in a fixed slot location, such as the symbols 0-3 as shown in FIG. 3. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 4:
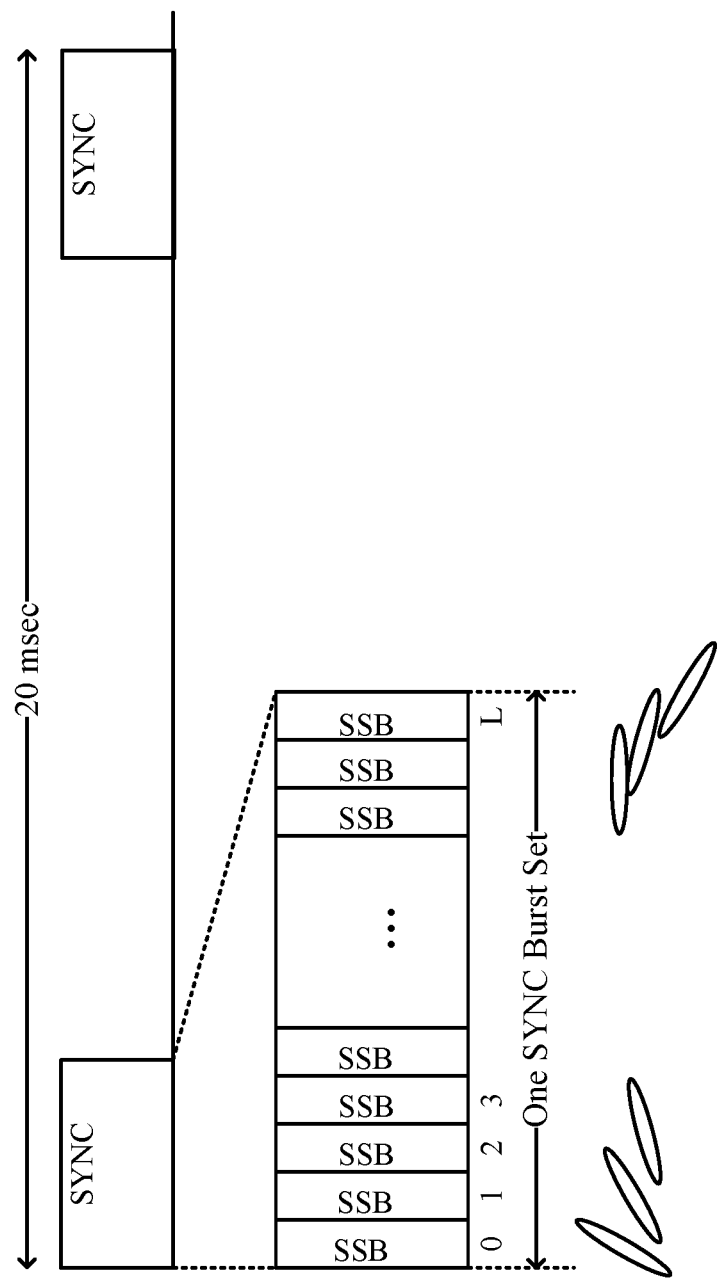
FIG. 4 illustrates how synchronization signal block (SSB) transmission using different beams, in accordance with certain aspects of the present disclosure.

As shown in FIG. 4, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

Certain deployment scenarios may include one or both NR deployment options. Some may be configured for non-standalone (NSA) and/or standalone (SA) option. A standalone cell may need to broadcast both SSB and remaining minimum system information (RMSI), for example, with SIB1 and SIB2. A non-standalone cell may only need to broadcast SSB, without broadcasting RMSI. In a single carrier in NR, multiple SSBs may be sent in different frequencies, and may include the different types of SSB.

Figure 5:
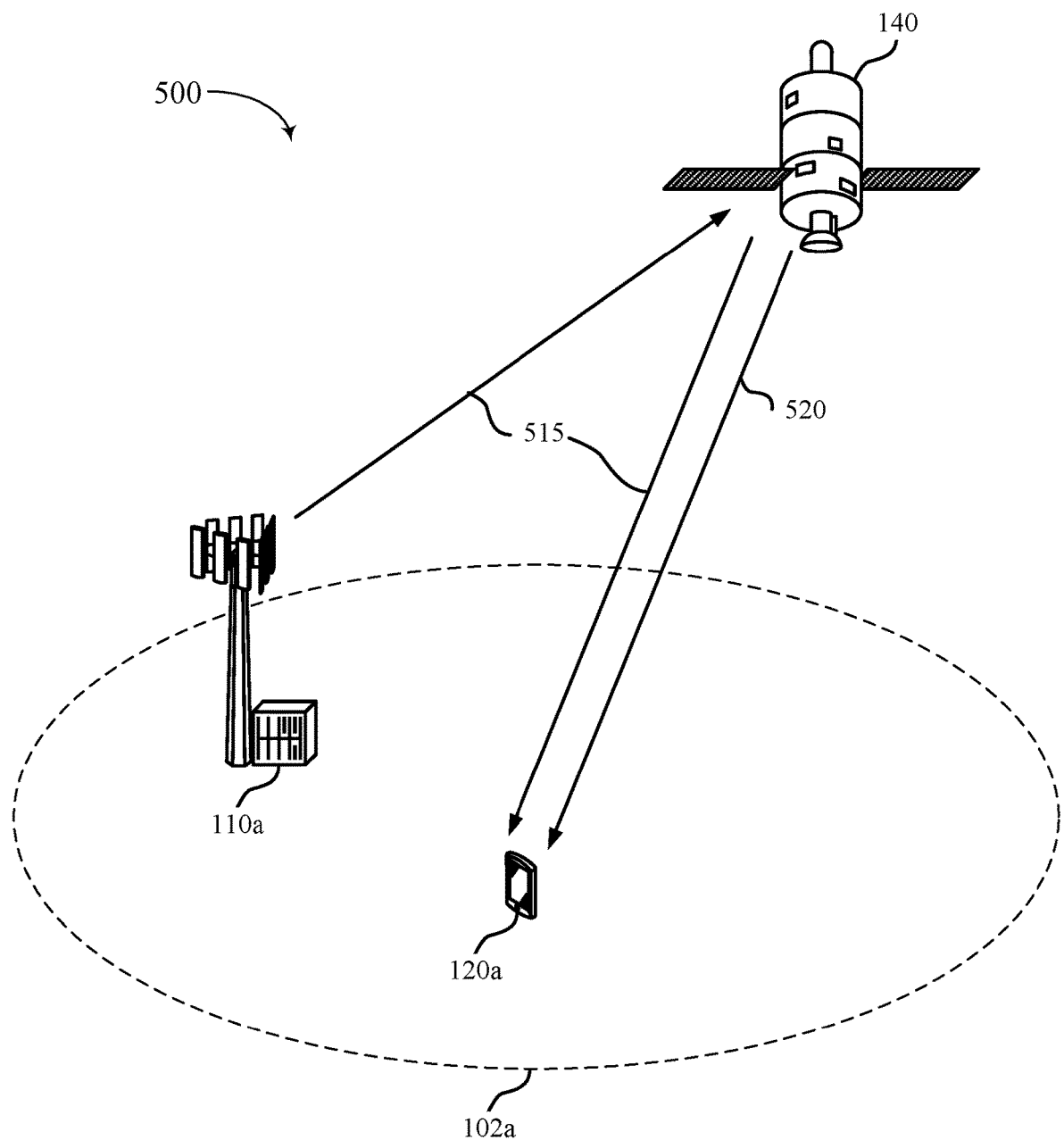
FIG. 5 is a block diagram conceptually illustrating an example telecommunications system, in accordance with certain aspects of the present disclosure.

FIG. 5 illustrates an example of a wireless communications system 500 that supports SSB transmissions with different frequency intervals, in accordance with aspects of the present disclosure. In some examples, wireless communications system 500 may implement aspects of wireless communication network 100. For example, wireless communications system 500 may include BS 110a, UE 120a, and satellite 140. BS 110a may serve coverage area or cell 102a in cases of a terrestrial network, and satellite 140 may serve coverage area 102a in cases of a non-terrestrial network (NTN). Some NTNs use high altitude platforms (e.g., balloons) in place of satellites.

Satellite 140 may communicate with BS 110a and UE 120a as part of wireless communications in an NTN. In cases of a terrestrial network, UE 120a may communicate with BS 110a over a communication link. In the case of NTN wireless communications, satellite 140 may be the serving BS for UE 120a. In certain aspects, the satellite 140 may act as a relay for the BS 110a and the UE 120a, relaying both data transmission and control signaling 515.

Satellite 140 may orbit the earth's surface at a particular altitude. The distance between satellite 140 and UE 120a may be much greater than the distance between BS 110a and UE 120a. The distance between UE 120a and satellite 140 may cause an increased round-trip delay (RTD) in communications between UE 120a and satellite 140. The satellite motion may cause the Doppler effect and contribute to a frequency shift in communications between UE 120a and satellite 140. The frequency shift may be also contributed to by error related to the local oscillation of either UE 120a or satellite 140. The RTD and frequency shift associated with communications in NTNs may lead to inefficiency in transmissions, latency, and inability to accurately transmit and receive messages.

UE 120a may determine to connect to satellite 140 using a random access procedure (RACH) (e.g., a four-step RACH). The initiation of the RACH procedure may begin with the transmission of a random access preamble (e.g., NR physical RACH (PRACH)) by UE 120a to satellite 140 or base station 110a. UE 120a may transmit the random access preamble in the PRACH. In some PRACH designs, there may be no estimation or accounting for the RTD or the frequency shift associated with NTNs.

In certain networks, such as terrestrial NR networks (e.g., 5G NR), SSBs transmitted by a cell are transmitted on the same frequency interval (e.g., occupying the same frequency interval).

In NTN, a satellite may use multiple antennas to form multiple narrow beams and the beams may operate on different frequency intervals to mitigate interference among the beams.

Figure 6A:
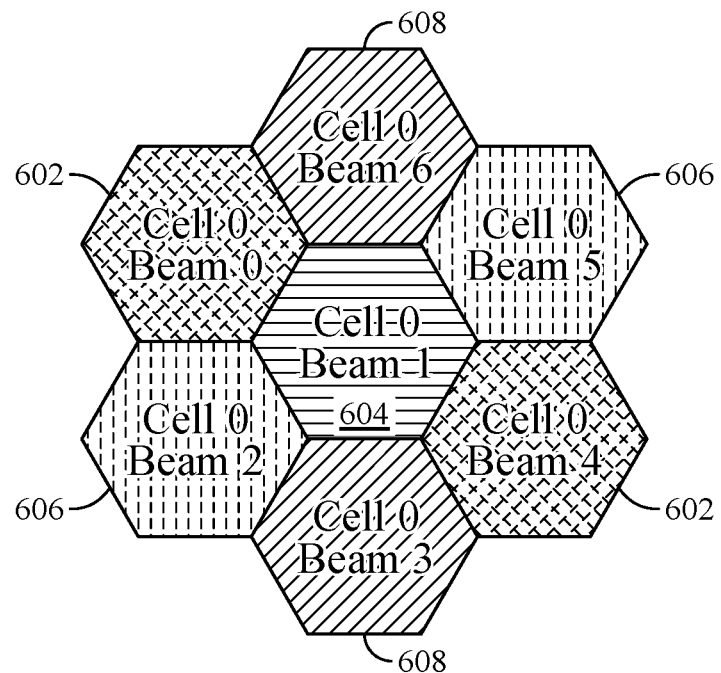
FIGS. 6A and 6B are example cell and beam patterns, in accordance with certain aspects of the present disclosure.

FIG. 6A illustrates beams from a satellite (e.g., satellite 140) configured as a single cell (e.g., cell 102a). As illustrated, each beam is configured as Cell 0. As shown, some beams are assigned to data and control transmission in different frequency intervals and some beam may be configured for data and control transmission in the same frequency interval (e.g., beams of the same color/shading). In the beam footprint map of FIG. 6A, neighboring beams may have different frequency intervals, such that beams that share a frequency interval are not neighboring. For example, Beam 0 and Beam 4 share frequency interval 602, but they are not neighboring each other on the beam footprint map. Similarly, beam2 and beam 5 share frequency interval 606 but are not neighboring beams, and beam 3 and beam 6 share frequency interval 608 but are not neighboring beams. Beam 1 neighbors Beams 0, 2, 3, 4, 5, and 6 does not share frequency interval 604 with any other beam on the beam footprint map. To be consistent with terrestrial NR on SSB transmissions, each antenna switch from its own frequency interval to the SSB frequency interval to transmit the SSB. This frequency switching may increase implementation complexity.

Figure 6B:
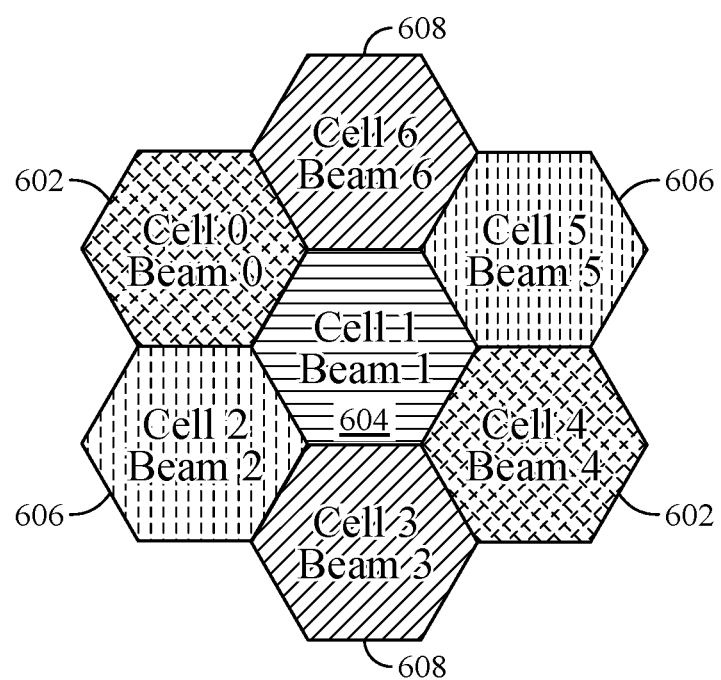

FIG. 6B illustrates beams from satellite (e.g., satellite 140) configured as different cells. In the beam footprint map of FIG. 6B, each beam is configured to a different cell. For example, Beam 0 is configured to Beam 0, Beam 1 is configured to Cell 1, and so forth. Regardless of cell configuration, neighboring beams have different frequency intervals, such that beams that share a frequency interval are not neighboring. For example, Beam 0 and Beam 4 share frequency interval 602, but they are not neighboring each other on the beam footprint map. Similarly, beam2 and beam 5 share frequency interval 606 but are not neighboring beams, and beam 3 and beam 6 share frequency interval 608 but are not neighboring beams. Beam 1 neighbors Beams 0, 2, 3, 4, 5, and 6 does not share frequency interval 604 with any other beam on the beam footprint map. Different beams may transmit SSBs in their respective own frequency intervals, and the aforementioned implementation complexity will be avoided. However, because each beam is configured as a different cell, beam switching means cell handover, which leads to changes to radio resource control (RRC) configurations such as Access Stratum (AS) security keys.

Accordingly, what is needed are techniques and apparatus for SSB transmissions in NTN.

Example Synchronization Signal Block Transmissions in Non-Terrestrial Networks

Aspects of the present disclosure provide for synchronization signal block (SSB) transmissions in different frequency intervals in non-terrestrial networks (NTNs).

According to certain aspects, SSBs may be transmitted according to time and frequency pattern. For example, the SSB pattern may indicate (e.g., define) the time and frequency locations for SSB transmissions. In this case, so when a user equipment (UE) detects the time and frequency location of one SSB transmission, the UE has information on other SSB transmissions in the SSB pattern. Because the SSB pattern indicates the time and frequency locations of SSB transmissions, the UE may easily switch beams and/or perform cell handover depending on coverage from the NTN as the UE moves relative to the NTN.

Figure 7:
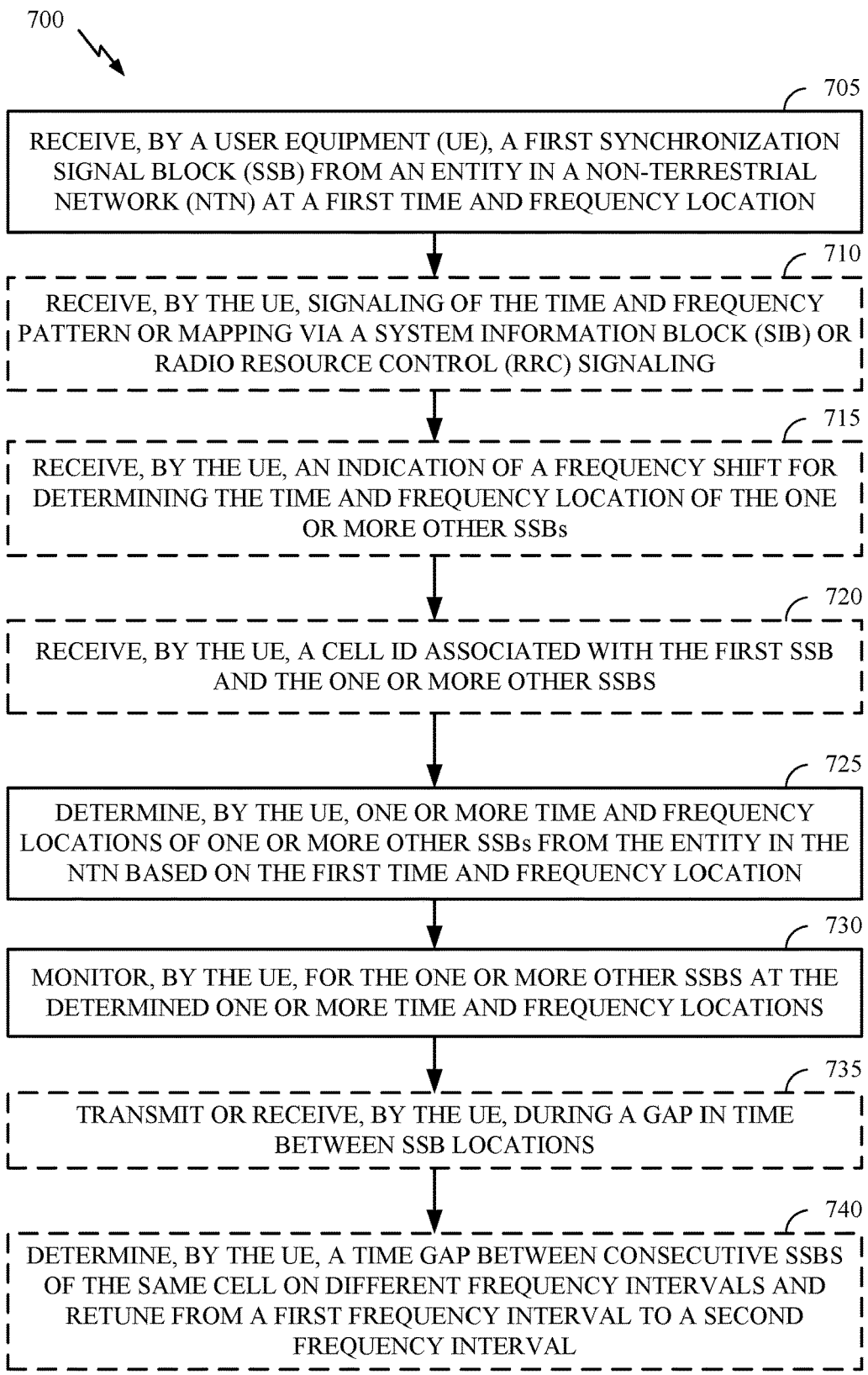
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by UE (e.g., such as a UE 120a in the wireless communication network 100). Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at 705, with the UE receiving a first SSB from an entity in a NTN at a first time and frequency location.

In some aspects, at 710, the UE may receive signaling of the time and frequency pattern or mapping via a system information block (SIB) or radio resource control (RRC) signaling. The time and frequency pattern may be signaled as a frequency grid, and the SSB locations may be indicated at a synchronization raster step size and based on synchronization raster indices.

In some aspects, at 715, the UE may receive an indication of a frequency shift for determining the time and frequency locations of one or more other SSBs. In such aspects, the first SSB and the one or more other SSBs are equally spaced in frequency.

In some aspects, at 720, the UE may receive a cell identifier (ID) associated with the first SSB and one or more other SSBs.

At 725, the UE determines one or more time and frequency locations of one or more other SSBs from the entity in the NTN based on the first time and frequency location.

At 730, the UE monitors for the one or more other SSBs at the determined one or more time and frequency locations.

In some aspects, at 735, the UE may transmit or receive during a gap in time between SSB locations.

In some aspects, at 740, the UE may determine a time gap between consecutive SSBs of the same cell on different frequency intervals, and retune from a first frequency interval associated with a SSB in a first cell to a second frequency interval associated with another SSB in a second cell during the time gap between the SSBs.

Figure 8:
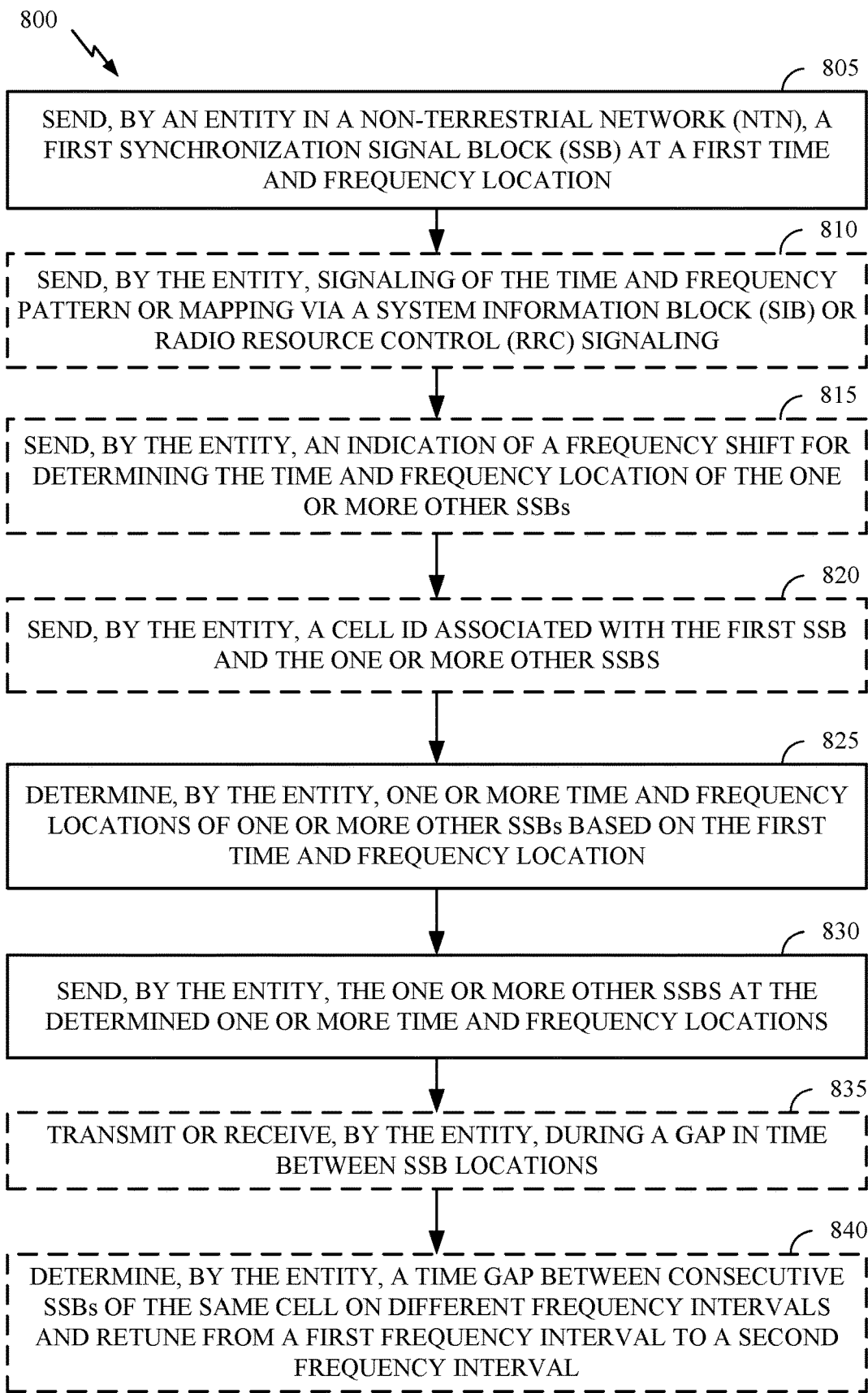
FIG. 8 is a flow diagram illustrating example operations for wireless communication by an entity in a non-terrestrial network (NTN), in accordance with certain aspects of the present disclosure.

FIG. 8 is a flow diagram illustrating example operations 800 for wireless communication, in accordance with certain aspects of the present disclosure. The operations 800 may be performed, for example, by an entity in an NTN (e.g., such as the satellite 140 which may be in communication with the wireless communication network 100). The operations 800 may be complimentary operations by the entity in the NTN to the operations 700 performed by the UE. Operations 800 may be implemented as software components that are executed and run on one or more processors. Further, the transmission and reception of signals by the entity in the NTN in operations 800 may be enabled, for example, by one or more antennas. In certain aspects, the transmission and/or reception of signals by the entity in the NTN may be implemented via a bus interface of one or more processors obtaining and/or outputting signals.

The operations 800 may begin, at 805, with an entity in a non-terrestrial network (NTN) sending a first synchronization signal block (SSB) at a first time and frequency location.

In some aspects, at 810, the entity may send signaling of the time and frequency pattern or mapping via an SIB or RRC signaling. The time and frequency pattern may be signaled as a frequency grid, and SSB locations may be indicated at a synchronization raster step size and based on synchronization raster indices.

In some aspects, at 815, the entity may send an indication of a frequency shift for the determining the time and frequency locations of one or more other SSBs, and the first SSB and the one or more other SSBs may be equally spaced in frequency.

In some aspects, at 820, the entity may send a cell ID associated with the first SSB and one or more other SSBs.

At 825, the entity determines one or more time and frequency locations of one or more other SSBs based on the first time and frequency location. Determining the one or more time and frequency locations may involve determining the one or more other time and frequency locations of the one or more other SSBS based on a configured or predefined time and frequency pattern or mapping of the first SSB and the other SSBs.

At 830, the entity sends the one or more other SSBs at the determined one or more time and frequency locations.

In some aspects, at 835, the entity may transmit or receive during a gap in time between SSB locations.

In some aspects, at 840, the entity may determine a time gap between consecutive SSBs of the same cell on different frequency intervals, and may retune from a first frequency interval associated with a SSB in a first beam to a second frequency interval associated with another SSB in a second beam during the time gap between the SSBs In certain aspects of the present disclosure, SSB transmissions are arranged in an SSB pattern in time and frequency (e.g., a time and frequency grid). For example, SSBs may be transmitted at a particular time and frequency based on the SSB pattern. Accordingly, the UE may infer the time-frequency location of all other SSBs in the pattern once the UE detects one SSB.

In some cases, the SSB pattern may be transmitted from a BS (e.g., BS 110a of FIG. 1) or from an entity in the NTN such as a satellite (e.g., satellite 140 of FIG. 5) to the UE (e.g., UE 120a). Other entities in the NTN may include a high-altitude platform device and balloons. The entity in the NTN may have multiple antennas configured to use multiple beams on different frequency intervals. The SSBs transmitted may be received from different beams of a same cell, from different beams of different cells, or from adjacent beams in different frequency intervals. In some aspects, a UE receives the SSB pattern via a SIB message or via a RRC signaling message. The UE may also receive the cell identifiers (e.g., physical cell IDs (PCI)) associated with the SSBs if the SSBs are associated with different cells.

Figure 9:
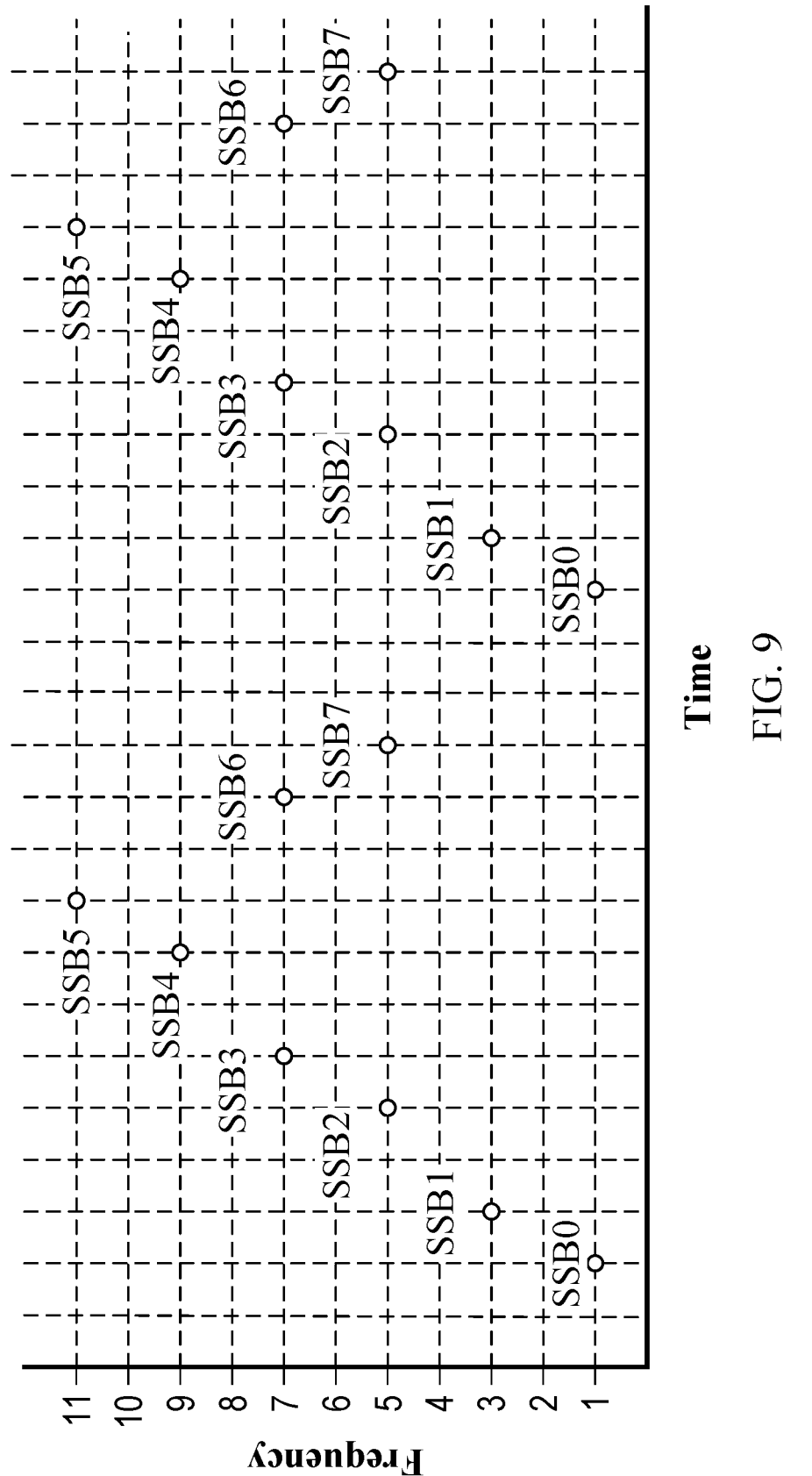
FIG. 9 is an example time-frequency pattern for SSB transmissions, in accordance with certain aspects of the present disclosure.

FIG. 9 shows a SSB pattern in time and frequency arranged in a time and frequency grid. The labeled dots in FIG. 9 represent the time and frequency locations where a SSB may be located. As mentioned, based on one time and frequency location, the UE can monitor for SSBs at other time and frequency locations dictated by the SSB pattern. For example, in FIG. 9, if the UE detects SSB0, it knows the time and frequency locations of all other SSBs by referring to the SSB pattern. The time locations of SSBs may be pre-defined or signaled so that the detection of one SSB time location indicates the time locations of all other SSBs in the SSB pattern. Similarly, the frequency locations may be specified in a predefined frequency grid.

In some cases, the SSB pattern may specify a time location of an SSB representing the starting time location (e.g., the starting OFDM symbol) of the SSB. The SSB pattern may specify the center frequency location of an SSB. The spacing between frequency intervals for the SSB transmissions may be uniform or may vary between adjacent pairs of SSB transmissions. The SSB pattern may also include time gaps between SSBs, which allows for transmissions such as physical downlink shared channel (PDSCH) transmission, hybrid automatic repeat request (HARD) ACK transmissions, and/or other transmissions. The SSB pattern may also allow for reception of transmissions during the time gaps between the SSBs. The SSB pattern may also repeat itself in time and frequency.

In some examples, signaling of the actual SSB frequency locations may use a synchronization raster step size as the unit and a synchronization raster entry as a reference for the SSB frequency locations. For example, the synchronization raster entries within a particular bandwidth may be indexed by 0, 1, 2, . . . 31. According to the example, for an SSB pattern indicating that SSB transmissions at indices 3, 10, 19, and 27, once the UE detects an SSB at one of these indices, the UE may determine the frequencies of the other three SSBs.

If all SSBs are equally spaced in frequency, the UE may receive signaling indicating the shift in the frequency (e.g., in integer multiples of the synchronization raster step size). Sending shifts in frequency may reduce the signaling sent to the UE.

If the SSB pattern in a first beam differs from the SSB pattern in a second beam only in frequency, the network may send a shift in frequency when configuring the SSB pattern for the second beam. A UE may derive the SSB pattern for the second beam based on the frequency shift and the SSB pattern for the first beam.

Figure 10A:
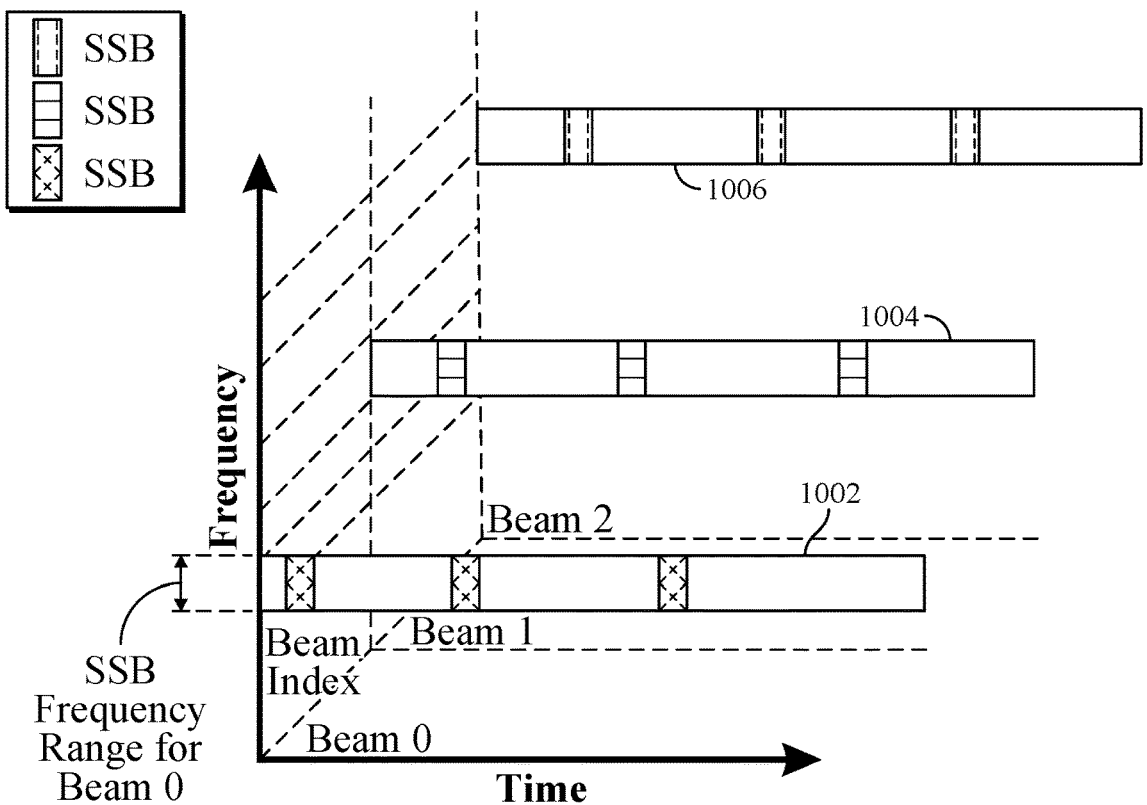
FIG. 10A illustrates SSB transmissions in different frequency intervals, in accordance with certain aspects of the present disclosure.
Figure 10B:
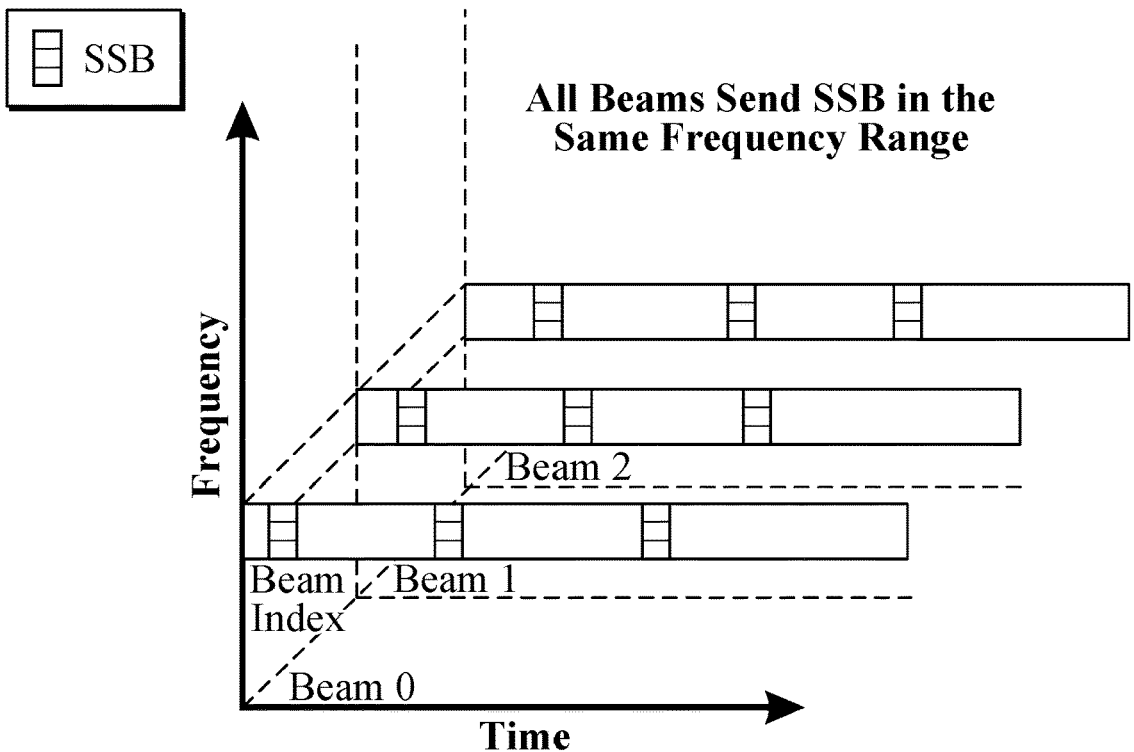
FIG. 10B illustrates SSB transmissions in identical frequency intervals.

FIGS. 10A and 10B illustrate SSB transmissions using different beams. Generally, in NR, the SSBs using different beams may be transmitted in identical frequency intervals, as shown in FIG. 10B. However, according to aspects of the present disclosure, for NTN, beams 0, 1, 2 may be adjacent, and may operate in different frequency intervals (1002, 1004, 1006) for the respective SSBs, as shown in FIG. 10A.

According to certain aspects of the present disclosure, a time gap may be configured between consecutive SSBs of a cell on different frequency intervals. The time gap may accommodate frequency retuning between different SSBs and different frequency intervals. Generally, frequency retuning requires time to allow a UE to change the frequency interval to receive the SSB transmissions, and a UE may not be able to receive consecutive SSBs if they are on different frequency intervals. Accordingly, the time gap may be used in the SSB pattern to accommodate for frequency retuning.

Figure 11:
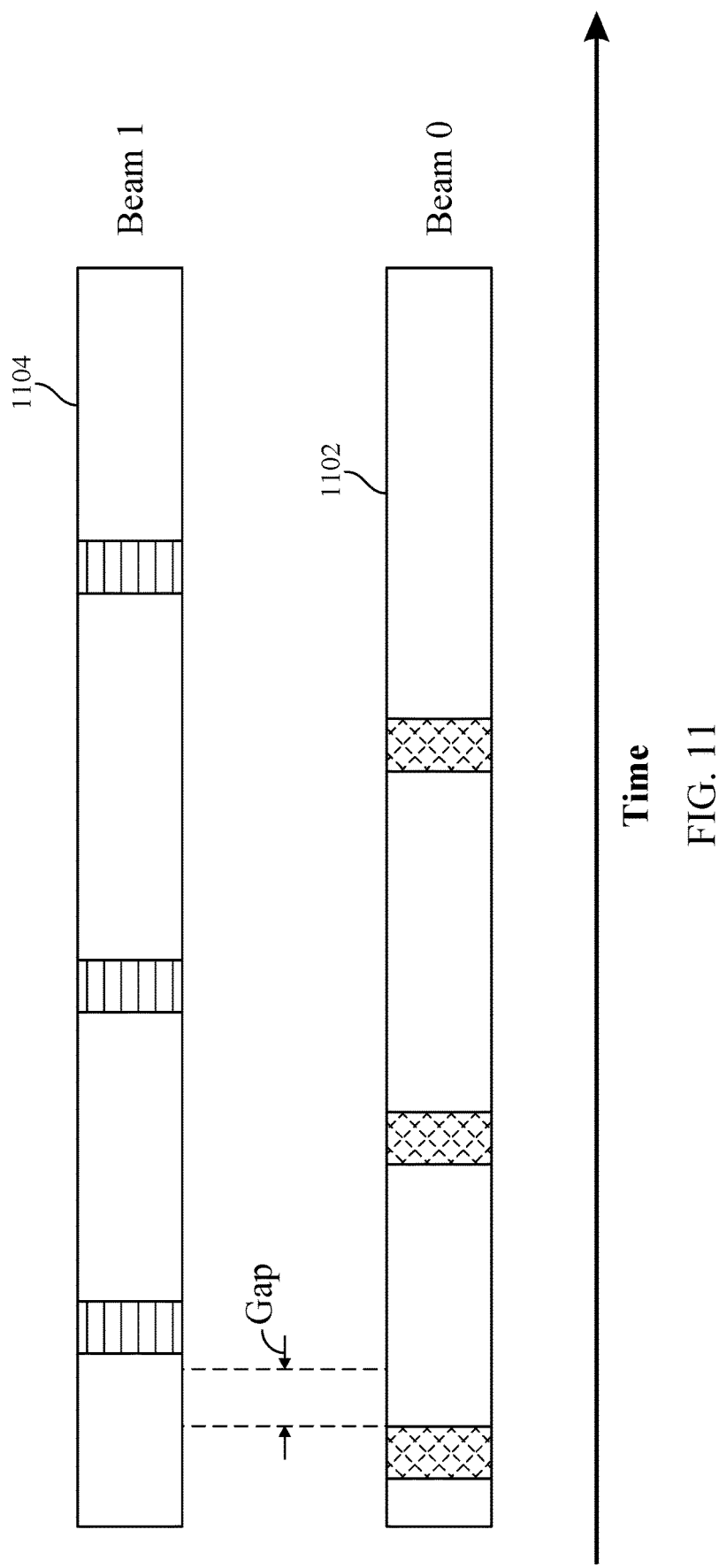
FIG. 11 illustrates time gaps for SSB transmissions, in accordance with certain aspects of the present disclosure.

FIG. 11 illustrates a gap between consecutive SSB transmissions of different beams on different frequency intervals. In NR, the minimum time gap may be zero, and accordingly, frequency retuning may not be possible if consecutive SSBs were transmitted on different frequency intervals.

The time gap may be indicated as an integer, and the unit may be a number of OFDM symbols corresponding to a particular subcarrier spacing (e.g., 30 kHz). The subcarrier spacing may depend on whether the frequency intervals are below or above a frequency threshold (e.g., 6 GHz). In some cases, different sets of symbols at which SSB transmissions may start may be configured, and each set may ensure a large enough minimum time gap to allow for frequency retuning.

In some aspects of the present disclosure, SSBs may be assigned to beams to minimize the need for a time gap and also to support frequency retuning. The assignment of SSB to beams may depend on an SSB pattern, a beam footprint map, and/or the rule that a SSB, if assigned to a beam, will use the frequency interval of that beam. Even though the SSBs are back-to-back in time, the SSB-to-beam assignment eliminates the need for non-zero time gaps. The non-zero time gaps may be greater than a certain value that depends on the minimum capability of the all UEs being served.

Figure 12A:
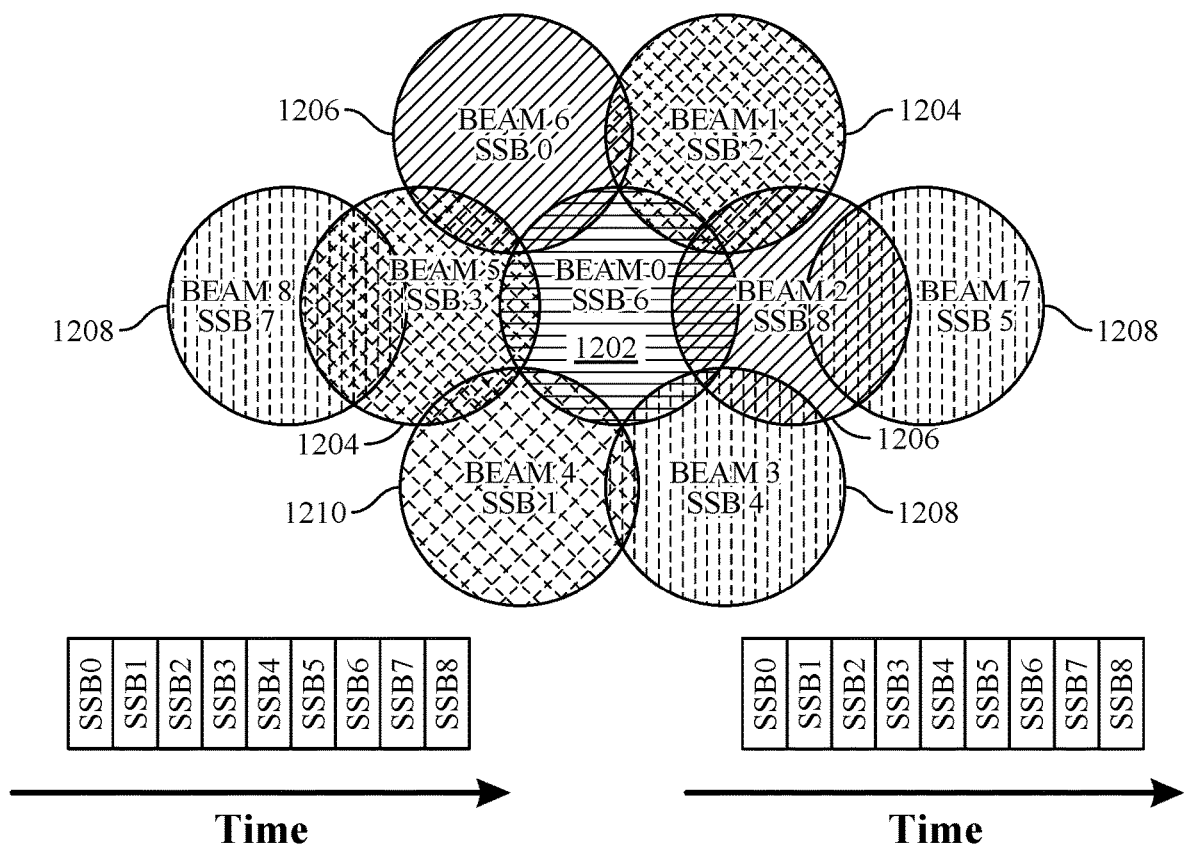
FIGS. 12A and 12B illustrates SSB-to-beam mapping, in accordance with certain aspects of the present disclosure.

FIG. 12A illustrates an example SSB-to-beam mapping. Each SSB is assigned to a beam, and each beam is assigned to a frequency interval. Some beams may be assigned to the same frequency interval. As illustrated in the beam footprint map of FIG. 12A, neighboring beams may be assigned different frequency intervals and the SSBs are configured to beams accordingly to reduce the need for time gaps and to support frequency retuning. In the example mapping of FIG. 12A, Beam 0 is assigned to frequency interval 1202; Beams 1 and 5 are assigned to frequency interval 1204; Beams 2 and 6 are assigned to frequency interval 1206, Beam 4 is assigned to frequency interval 1210; and Beams 3, 7, and 8 are assigned to frequency interval 1208. As for the SSBs configured to the beams, SSB0 is configured to Beam 6, SSB1 is configured to Beam 4, SSB2 is configured to Beam 1, SSB5 is configured to Beam 7, SSB3 is configured to Beam 5, SSB 4 is configured to Beam 3, SSB 6 is configured to Beam 0, SSB 7 is configured to Beam 8, and SSB8 is configured to Beam 2. As illustrated in FIG. 12A, the SSB-to-beam mapping eliminates the need for non-zero time gaps even though the SSBs are back to back in time because the adjacent SSBs transmissions in time are placed in non-neighboring beams. Any assignment of beam to frequency interval may be used with the SSB-to-beam mapping disclosed herein.

Figure 12B:
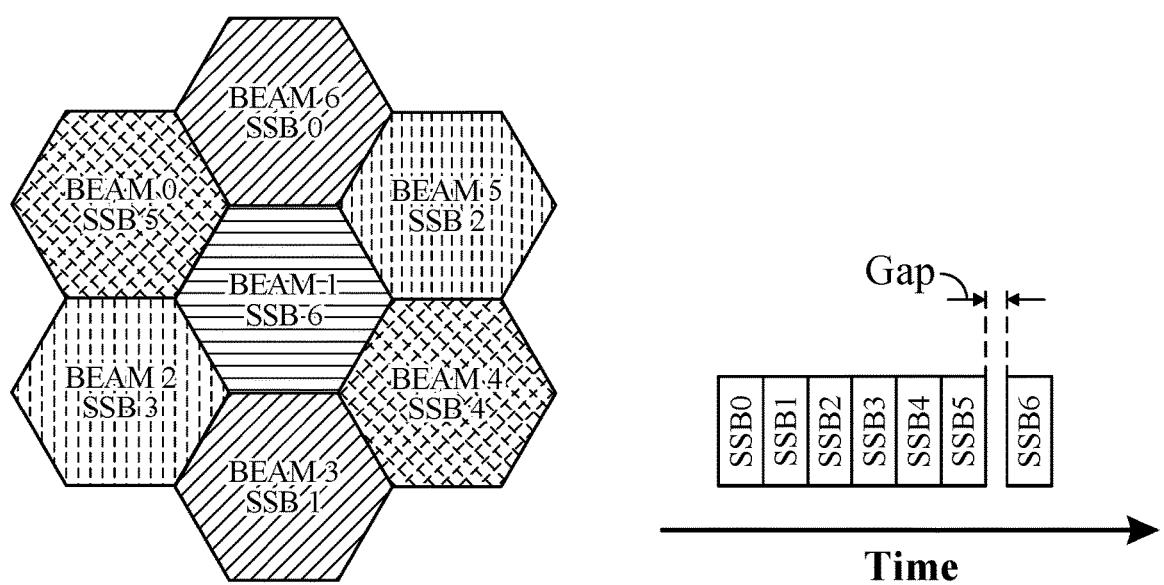

In some cases, use of a time gaps may not be avoided. In this case, time gaps may be configured to accommodate frequency retuning. FIG. 12B illustrates a SSB-to-beam mapping using a time gap between two SSB transmissions to allow for frequency retuning. In this example mapping, the seven SSBs use a time gap regardless of the assignment of SSBs and beams to the beam footprints because there are only 5 non-neighboring SSBs for SSB6. FIG. 12B illustrates a SSB-to-beam mapping to allow frequency retuning with a time gap between SSB5 and SSB6.

According to certain aspects of the present disclosure, the UE (e.g., a UE deployed in a NTN) may be pre-programmed to perform cell search assuming that SSBs on different beams from the same cell may occupy different frequency intervals. Assuming that SSBs on different beams from the same cell may occupy the same frequency interval and if the cell search fails, the UE may continue cell search assuming that SSBs on different beams from the same cell occupy different frequency intervals.

A UE may be pre-programmed to perform cell search assuming that SSBs on different beams from the same cell occupy the same frequency interval, e.g., a UE deployed in a terrestrial network.

In some aspects, synchronization rasters may be defined for a frequency interval or a frequency band. One of these synchronization rasters may have a larger synchronization raster step size than another synchronization raster. The UE may perform cell searching assuming the larger step size, and if the search fails, the UE proceeds again with cell searching with the smaller step size.

Figure 13:
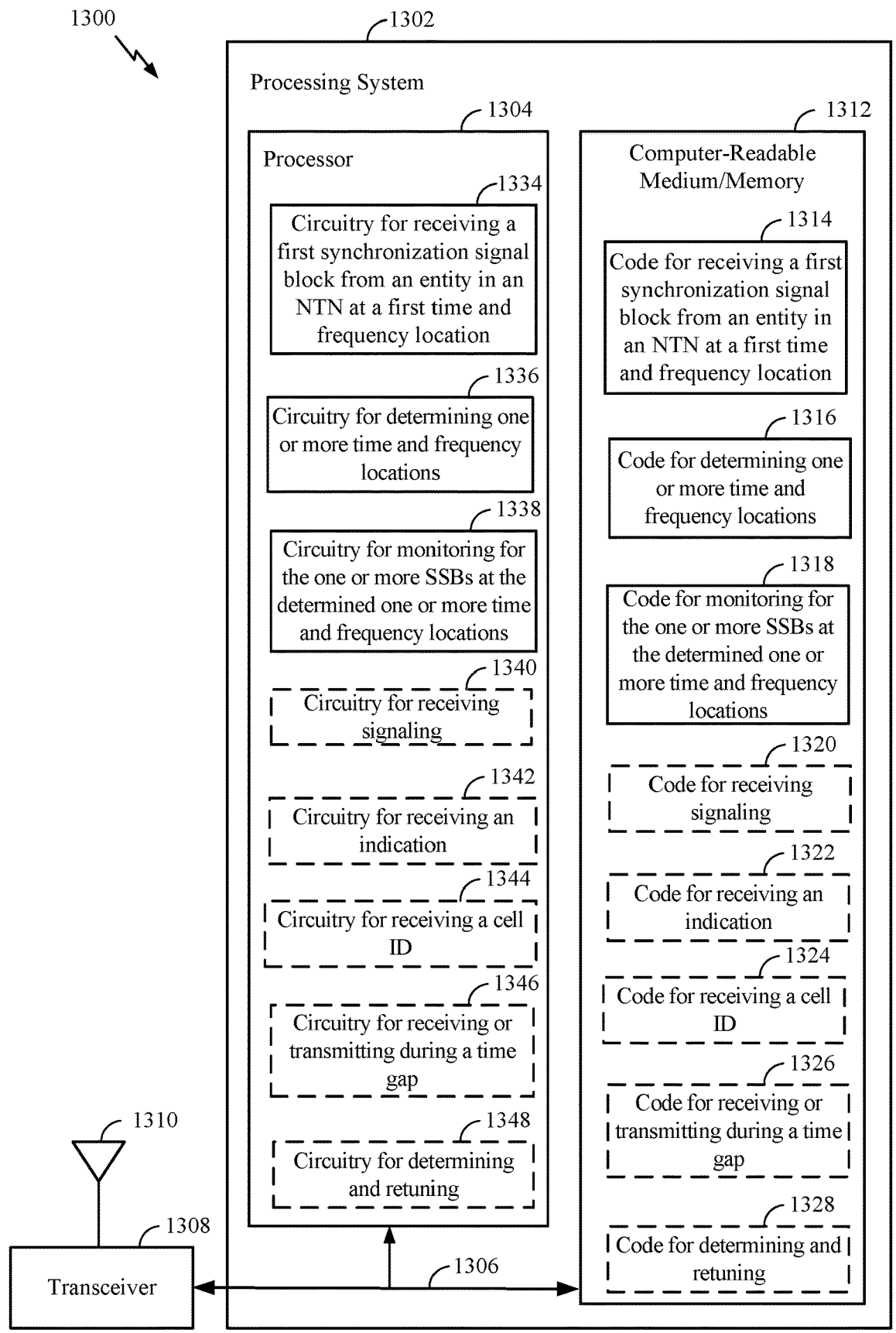
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 7. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 7, or other operations for performing the various techniques discussed herein for SSBs in different frequency intervals in NTN. In certain aspects, computer-readable medium/memory 1312 stores code 1314 for receiving a first SSB from an entity in a NTN at a first time and frequency location; code 1316 for determining one or more time and frequency locations of one or more other SSBs from the entity in the NTN based on the first time and frequency location, and code 1318 for monitoring for the one or more other SSBs at the determined one or more time and frequency locations. In certain aspects, computer-readable medium/memory 1312 may stores code 1320 for receiving signaling of the time and frequency pattern or mapping via a SIB or RRC signaling. In certain aspects, computer-readable medium/memory 1312 may stores code 1322 for receiving an indication of a frequency shift for the determining the time and frequency locations of the one or more other SSBs. In certain aspects, computer-readable medium/memory 1312 may stores code 1324 for receiving a cell ID associated with the first SSB and the one or more other SSBs. In certain aspects, computer-readable medium/memory 1312 may stores code 1326 for transmitting or receiving during a gap in time between SSB locations. In certain aspects, computer-readable medium/memory 1312 may stores code 1328 for determining a time gap between consecutive SSBs of the same cell on different frequency intervals and for retuning from a first frequency interval associated with a SSB in a first beam to a second frequency interval associated with another SSB in a second beam during the time gap between the SSBs. In certain aspects, the processor 1304 has circuitry configured to implement the code stored in the computer-readable medium/memory 1312. The processor 1304 includes circuitry 1324 for receiving a first SSB from an entity in a NTN at a first time and frequency location; circuitry 1326 for determining one or more time and frequency locations of one or more other SSBs from the entity in the NTN based on the first time and frequency location; and circuitry 1328 for monitoring for the one or more other SSBs at the determined one or more time and frequency locations. In certain aspects, processor 1304 may include circuitry 1340 for receiving signaling of the time and frequency pattern or mapping via a SIB or RRC signaling. In certain aspects, processor 1304 may include circuitry 1342 for receiving an indication of a frequency shift for the determining the time and frequency locations of the one or more other SSBs. In certain aspects, processor 1304 may include circuitry 1344 for receiving a cell ID associated with the first SSB and the one or more other SSBs. In certain aspects, processor 1304 may include circuitry 1346 for transmitting or receiving during a gap in time between SSB locations. In certain aspects, processor 1304 may include circuitry 1348 for determining a time gap between consecutive SSBs of the same cell on different frequency intervals and for retuning from a first frequency interval associated with a SSB in a first beam to a second frequency interval associated with another SSB in a second beam during the time gap between the SSBs.

For example, means for transmitting (or means for outputting for transmission) may include the transmitter unit 254 and/or antenna(s) 252 of the UE 120a illustrated in FIG. 2. Means for receiving (or means for obtaining) may include a receiver and/or antenna(s) 252 of the UE 120a illustrated in FIG. 2 and/or circuitry 1334 of the communication device 1300 in FIG. 13. Means for communicating may include a transmitter, a receiver or both. Means for generating, means for performing, means for determining, means for taking action, means for determining, means for coordinating may include a processing system, which may include one or more processors, such as the receive processor 258, the transmit processor 264, the TX MIMO processor 266, and/or the controller/processor 280 of the UE 120a illustrated in FIG. 2 and/or the processing system 1302 of the communication device 1300 in FIG. 13.

Figure 14:
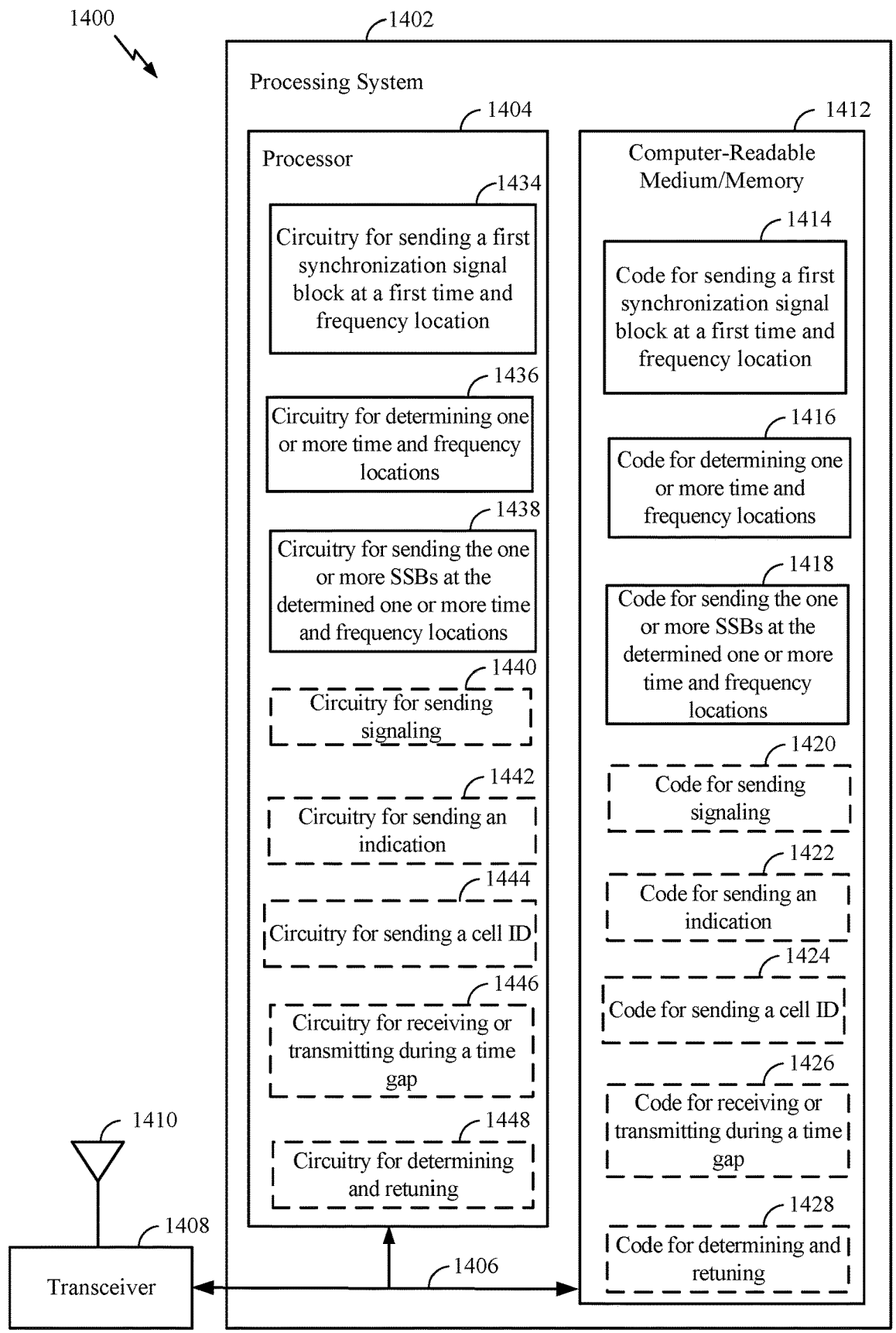
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 8. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 412 is configured to store instructions (e.g., computer-executable code) that when executed by the processor 1404, cause the processor 1404 to perform the operations illustrated in FIG. 8, or other operations for performing the various techniques discussed herein for SSBs in different frequency intervals in NTN. In certain aspects, computer-readable medium/memory 1412 stores code 1414 for sending a first SSB at a first time and frequency location; code 1416 for determining one or more time and frequency locations of one or more other SSBs based on the first time and frequency location; and code 1418 for sending the one or more other SSBs at the determined one or more time and frequency locations. In certain aspects, computer-readable medium/memory 1412 may stores code 1420 for sending signaling of the time and frequency pattern or mapping via a SIB or RRC signaling. In certain aspects, computer-readable medium/memory 1412 may store code 1422 for sending an indication of a frequency shift for the determining the time and frequency locations of the one or more other SSBs. In certain aspects, computer-readable medium/memory 1412 may stores code 1424 for sending a cell ID associated with the first SSB and the one or more other SSBs. In certain aspects, computer-readable medium/memory 1412 may stores code 1426 for transmitting or receiving during a gap in time between SSB locations. In certain aspects, computer-readable medium/memory 1412 may stores code 1428 for determining a time gap between consecutive SSBs of the same cell on different frequency intervals and for retuning from a first frequency interval associated with a SSB in a first beam to a second frequency interval associated with another SSB in a second beam during the time gap between the SSBs. In certain aspects, the processor 1404 has circuitry configured to implement the code stored in the computer-readable medium/memory 1412. The processor 1404 includes circuitry 1424 for sending a first SSB at a first time and frequency location; circuitry 1426 for determining one or more time and frequency locations of one or more other SSBs based on the first time and frequency location; and circuitry 1428 for sending the one or more other SSBs at the determined one or more time and frequency locations. In certain aspects, processor 1404 may include circuitry 1440 for sending signaling of the time and frequency pattern or mapping via a SIB or RRC signaling. In certain aspects, processor 1404 may include circuitry 1442 for sending an indication of a frequency shift for the determining the time and frequency locations of the one or more other SSBs. In certain aspects, processor 1404 may include circuitry 1444 for sending a cell ID associated with the first SSB and the one or more other SSBs. In certain aspects, processor 1404 may include circuitry 1446 for transmitting or receiving during a gap in time between SSB locations. In certain aspects, processor 1404 may include circuitry 1448 for determining a time gap between consecutive SSBs of the same cell on different frequency intervals and for retuning from a first frequency interval associated with a SSB in a first beam to a second frequency interval associated with another SSB in a second beam during the time gap between the SSBs.

For example, means for transmitting (or means for outputting for transmission) may include a transmitter and/or an antenna(s) 234 or the BS 110a illustrated in FIG. 2 and/or circuitry 1434 of the communication device 1400 in FIG. 14. Means for receiving (or means for obtaining) may include a receiver and/or an antenna(s) 234 of the BS 110a illustrated in FIG. 2. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110a illustrated in FIG. 2 and/or the processing system 1402 of the communication device 1400 in FIG. 14.

EXAMPLE ASPECTS

Implementation examples are described in the following numbered aspects:

Aspect 1: A method of wireless communication by a user equipment, comprising: receiving a first synchronization signal block (SSB) from an entity in a non-terrestrial network (NTN) at a first time and frequency location; determining one or more time and frequency locations of one or more other SSBs from the entity in the NTN based on the first time and frequency location; and monitoring for the one or more other SSBs at the determined one or more time and frequency locations.

Aspect 2: The method of aspect 1, wherein the entity comprises at least one of a high-altitude platform device, a satellite, or a balloon.

Aspect 3: The method of any of aspects 1-2, wherein the entity comprises multiple antennas configured to use multiple beams on different frequency intervals.

Aspect 4: The method of any of aspects 1-3, wherein the first SSB and the one or more other SSBs are received from different beams of a same cell.

Aspect 5: The method of any of aspects 1-4, wherein the first SSB and the one or more other SSBs are each from different beams of different cell.

Aspect 6: The method of any of aspects 1-5, wherein SSBs, of the first SSB and the one or more other SSBs, received from adjacent beams are received in different frequency intervals.

Aspect 7: The method of any of aspects 1-6, wherein determining the one or more other time and frequency locations of the one or more other SSBs comprises determining the one or more other time and frequency locations of the one or more other SSBs based on a configured or predefined time and frequency pattern or mapping of the first SSB and the one or more other SSBs.

Aspect 8: The method of aspect 7, further comprising: receiving signaling of the time and frequency pattern or mapping via a system information block (SIB) or radio resource control (RRC) signaling.

Aspect 9: The method of any of aspects 7-8, wherein the time and frequency pattern is signaled as a frequency grid, and wherein the SSB locations are indicated at a synchronization raster step size and based on synchronization raster indices.

Aspect 10: The method of any of aspects 7-9, wherein: the first SSB and the one or more other SSBs are equally spaced in frequency; and the method further comprises receiving an indication of a frequency shift for the determining the time and frequency locations of the one or more other SSBs.

Aspect 11: The method of any of aspects 7-10, further comprising: receiving a cell ID associated with the first SSB and the one or more other SSBs.

Aspect 12: The method of any of aspects 7-11, wherein the time and frequency pattern of the first SSB and the one or more other SSBs comprises a pattern or mapping of a center frequency location and a starting symbol of the first SSB and the one or more other SSBs.

Aspect 13: The method of any of aspects 7-12, further comprising: transmitting or receiving during a gap in time between SSB locations.

Aspect 14: The method of any of aspects 4-13, further comprising: determining a time gap between consecutive SSBs of the same cell on different frequency intervals; and retuning from a first frequency interval associated with a SSB in a first beam to a second frequency interval associated with another SSB in a second beam during the time gap between the SSBs.

Aspect 15: The method of aspect 14, further comprising receiving an indication of the time gap, wherein the time gap is indicated as an integer number of orthogonal frequency division multiplexing (OFDM) symbols corresponding to a subcarrier spacing (SCS) associated with the frequency intervals.

Aspect 16: The method of any of aspects 14-15, further comprising: receiving a configuration of different sets of starting symbols associated with different SSBs, wherein the different sets of starting symbols defined the time gap.

Aspect 17: The method of aspect 4, wherein a time gap is greater than a value dependent on minimum capability of the UEs.

Aspect 18: The method of any of aspects 1-17, wherein, for each of one or more frequency intervals associated with the first SSB and the one or more other SSBs, the UE is configured with at least two synchronization rasters of different step sizes.

Aspect 19: The method of aspect 18, wherein monitoring for the one or more other SSBs comprises: first monitoring using the synchronization raster having a larger step size; and monitoring using the synchronization raster having a smaller step size if an SSB is not detected using the synchronization raster having the larger step size.

Aspect 20: A method of wireless communication by an entity in a non-terrestrial network (NTN), comprising: sending a first synchronization signal block (SSB) at a first time and frequency location; determining one or more time and frequency locations of one or more other SSBs based on the first time and frequency location; and sending the one or more other SSBs at the determined one or more time and frequency locations.

Aspect 21: The method of aspect 20, wherein the entity comprises one of a high-altitude platform device, a satellite, or a balloon.

Aspect 22: The method of any of aspects 20-21, wherein the entity comprises multiple antennas configured to use multiple beams on different frequency intervals.

Aspect 23: The method of any of aspects 20-22, wherein the first SSB and the one or more other SSBs are sent from different beams of a same cell.

Aspect 24: The method of any of aspects 20-23, wherein the first SSB and the one or more other SSBs are each from different beams of different cell.

Aspect 25: The method of any of aspects 20-24, wherein SSBs, of the first SSB and the one or more other SSBs, sent from adjacent beams are sent in different frequency intervals.

Aspect 26: The method of any of aspects 20-25, wherein determining the one or more other time and frequency locations of the one or more other SSBs comprises determining the one or more other time and frequency locations of the one or more other SSBs based on a configured or predefined time and frequency pattern or mapping of the first SSB and the one or more other SSBs.

Aspect 27: The method of claim 26, further comprising: sending signaling of the time and frequency pattern or mapping via a system information block (SIB) or radio resource control (RRC) signaling.

Aspect 28: The method of any of aspects 26-27, wherein the time and frequency pattern is signaled as a frequency grid, and wherein the SSB locations are indicated at a synchronization raster step size and based on synchronization raster indices.

Aspect 29: The method of any of aspects 26-28, wherein: the first SSB and the one or more other SSBs are equally spaced in frequency; and the method further comprises sending an indication of a frequency shift for the determining the time and frequency locations of the one or more other SSBs.

Aspect 30: The method of any of aspects 26-29, further comprising: sending a cell ID associated with the first SSB and the one or more other SSBs.

Aspect 31: The method of any of aspects 26-30, wherein the time and frequency pattern of the first SSB and the one or more other SSBs comprises a pattern or mapping of a center location and a starting symbol of the first SSB and the one or more other SSBs.

Aspect 32: The method of any of aspects 26-31, further comprising: transmitting or receiving during a gap in time between SSB locations.

Aspect 33: The method of any of aspects 23-32, further comprising: determining a time gap between consecutive SSBs of the same cell on different frequency intervals; and retuning from a first frequency interval associated with a SSB in a first beam to a second frequency interval associated with another SSB in a second beam during the time gap between the SSBs.

Aspect 34: The method of aspect 33, further comprising sending an indication of the time gap, wherein the time gap is indicated as an integer number of orthogonal frequency division multiplexing (OFDM) symbols corresponding to a subcarrier spacing (SCS) associated with the frequency intervals.

Aspect 35: The method of any of aspects 33-34, further comprising: sending a configuration of different sets of starting symbols associated with different SSBs, wherein the different sets of starting symbols defined the time gap.

Aspect 36: The method of any of aspects 23-35, wherein a time gap is greater than a value dependent on minimum capability of the UEs.

Aspect 37: The method of any of aspects 20-36, wherein, for each of one or more frequency intervals associated with the first SSB and the one or more other SSBs, sending an indication of at least two synchronization rasters of different step sizes.

Aspect 38: An apparatus comprising means for performing the method of any of aspects 1 through 37.

Aspect 39: An apparatus comprising at least one processor and a memory coupled to the at least one processor, the memory comprising code executable by the at least one processor to cause the apparatus to perform the method of any of aspects 1 through 37.

Aspect 40: A computer readable medium storing computer executable code thereon for wireless communications that, when executed by at least one processor, cause an apparatus to perform the method of any of aspects 1 through 37.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. An apparatus of wireless communication, comprising:
   at least one processor; and
   a memory coupled to the at least one processor, the memory comprising code executable by the at least one processor to cause the apparatus to:
   receive a first synchronization signal block (SSB) from an entity in a non-terrestrial network (NTN) at a first time and frequency location;
   determine one or more time and frequency locations of one or more other SSBs from the entity in the NTN based on the first time and frequency location and a configured or predefined time and frequency pattern or mapping of the first SSB and the one or more other SSBs; and
   monitor for the one or more other SSBs at the one or more time and frequency locations.

2. The apparatus of claim 1, wherein the entity comprises at least one of a high-altitude platform device, a satellite, a balloon, or multiple antennas configured to use multiple beams on different frequency intervals.

3. The apparatus of claim 1, wherein:
   the first SSB and the one or more other SSBs are received from different beams of a same cell or of different cells; and
   SSBs, of the first SSB and the one or more other SSBs, received from adjacent beams are received in different frequency intervals.

4. The apparatus of claim 1, wherein the memory further comprises code executable by the at least one processor to cause the apparatus to receive signaling of the time and frequency pattern or mapping via a system information block (SIB) or radio resource control (RRC) signaling.

5. The apparatus of claim 1, wherein the time and frequency pattern is signaled as a frequency grid, and wherein the locations of the first SSB and the one or more other SSBs are indicated at a synchronization raster step size and based on synchronization raster indices.

6. The apparatus of claim 1, wherein:
   the first SSB and the one or more other SSBs are equally spaced in frequency; and
   the memory further comprises code executable by the at least one processor to cause the apparatus to receive an indication of a frequency shift for determining the time and frequency locations of the one or more other SSBs.

7. The apparatus of claim 1, wherein the memory further comprises code executable by the at least one processor to cause the apparatus to receive a cell ID associated with the first SSB and the one or more other SSBs.

8. The apparatus of claim 1, wherein the time and frequency pattern of the first SSB and the one or more other SSBs comprises a pattern or mapping of a center frequency location and a starting symbol of the first SSB and the one or more other SSBs.

9. The apparatus of claim 1, wherein the memory further comprises code executable by the at least one processor to cause the apparatus to transmit or receive during a gap in time between SSB locations.

10. The apparatus of claim 1, wherein the memory further comprises code executable by the at least one processor to cause the apparatus to:
    determine a time gap between consecutive SSBs of a same cell on different frequency intervals; and
    retune from a first frequency interval associated with a SSB in a first beam to a second frequency interval associated with another SSB in a second beam during the time gap between the SSBs.

11. The apparatus of claim 10, wherein the memory further comprises code executable by the at least one processor to cause the apparatus to:
    receive an indication of the time gap, wherein the time gap is indicated as an integer number of orthogonal frequency division multiplexing (OFDM) symbols corresponding to a subcarrier spacing (SCS) associated with the different frequency intervals; and
    receive a configuration of different sets of starting symbols associated with different SSBs, wherein the different sets of starting symbols define the time gap, and wherein the time gap is greater than a value dependent on minimum capability of the apparatus.

12. The apparatus of claim 1, wherein, for each of one or more frequency intervals associated with the first SSB and the one or more other SSBs, the apparatus is configured with at least two synchronization rasters of different step sizes.

13. The apparatus of claim 12, wherein the code executable by the at least one processor to cause the apparatus to monitor for the one or more other SSBs comprises code executable by the at least one processor to cause the apparatus to:
    first monitor using a synchronization raster of the at least two synchronization rasters having a larger step size; and
    monitor using a synchronization raster of the at least two synchronization rasters having a smaller step size if an SSB is not detected using the synchronization raster having the larger step size.

14. An apparatus of wireless communication in a non-terrestrial network (NTN), comprising:
    at least one processor; and
    a memory coupled to the at least one processor, the memory comprising code executable by the at least one processor to cause the apparatus to:
    send a first synchronization signal block (SSB) at a first time and frequency location;
    determine one or more time and frequency locations of one or more other SSBs based on the first time and frequency location and a configured or predefined time and frequency pattern or mapping of the first SSB and the one or more other SSBs; and
    send the one or more other SSBs at the one or more time and frequency locations.

15. The apparatus of claim 14, wherein the apparatus comprises one of a high-altitude platform device, a satellite, or a balloon.

16. The apparatus of claim 14, further comprising multiple antennas configured to use multiple beams on different frequency intervals.

17. The apparatus of claim 14, wherein:
the first SSB and the one or more other SSBs are sent from different beams of a same cell or different cells; and
SSBs, of the first SSB and the one or more other SSBs, sent from adjacent beams are sent in different frequency intervals.

18. The apparatus of claim 14, wherein the memory further comprises code executable by the at least one processor to cause the apparatus to send signaling of the time and frequency pattern or mapping via a system information block (SIB) or radio resource control (RRC) signaling.

19. The apparatus of claim 14, wherein the time and frequency pattern is signaled as a frequency grid, and wherein the locations of the first SSB and the one or more other SSBs are indicated at a synchronization raster step size and based on synchronization raster indices.

20. The apparatus of claim 14, wherein:
the first SSB and the one or more other SSBs are equally spaced in frequency; and
the memory further comprises code executable by the at least one processor to cause the apparatus to send an indication of a frequency shift for determining the time and frequency locations of the one or more other SSBs.

21. The apparatus of claim 14, wherein the memory further comprises code executable by the at least one processor to cause the apparatus to send a cell identifier (ID) associated with the first SSB and the one or more other SSBs.

22. The apparatus of claim 14, wherein the time and frequency pattern of the first SSB and the one or more other SSBs comprises a pattern or mapping of a center location and a starting symbol of the first SSB and the one or more other SSBs.

23. The apparatus of claim 14, wherein the memory further comprises code executable by the at least one processor to cause the apparatus to transmit or receive during a gap in time between SSB locations.

24. The apparatus of claim 17, the memory further comprises code executable by the at least one processor to cause the apparatus to:
determine a time gap between consecutive SSBs of a same cell on different frequency intervals; and
retune from a first frequency interval associated with a SSB in a first beam to a second frequency interval associated with another SSB in a second beam during the time gap between the SSBs.

25. The apparatus of claim 24, wherein the memory further comprises code executable by the at least one processor to cause the apparatus to:
send an indication of the time gap, wherein the time gap is indicated as an integer number of orthogonal frequency division multiplexing (OFDM) symbols corresponding to a subcarrier spacing (SCS) associated with the different frequency intervals; and
send a configuration of different sets of starting symbols associated with different SSBs; wherein the different sets of starting symbols defined the time gap, and wherein the time gap is be greater than a value dependent on minimum capability of UEs.

26. The apparatus of claim 14, wherein the memory further comprises code executable by the at least one processor to cause the apparatus to, for each of one or more frequency intervals associated with the first SSB and the one or more other SSBs, send an indication of at least two synchronization rasters of different step sizes.

27. A method of wireless communication by a user equipment, comprising:
receiving a first synchronization signal block (SSB) from an entity in a non-terrestrial network (NTN) at a first time and frequency location;
determining one or more time and frequency locations of one or more other SSBs from the entity in the NTN based on the first time and frequency location and a configured or predefined time and frequency pattern or mapping of the first SSB and the one or more other SSBs; and
monitoring for the one or more other SSBs at the one or more time and frequency locations.

28. A method of wireless communication by an entity in a non-terrestrial network (NTN), comprising:
sending a first synchronization signal block (SSB) at a first time and frequency location;
determining one or more time and frequency locations of one or more other SSBs based on the first time and frequency location and a configured or predefined time and frequency pattern or mapping of the first SSB and the one or more other SSBs; and
sending the one or more other SSBs at the one or more time and frequency locations.

* * * * *